(12) United States Patent
Visser

(10) Patent No.: US 11,748,018 B2
(45) Date of Patent: Sep. 5, 2023

(54) DEVICES AND METHODS FOR TRANSFERRING OPTIMIZED MASS DATA TO THE CLOUD

(71) Applicant: The Migration Company PTY LTD, Melbourne (AU)

(72) Inventor: Roux Visser, Elwood (AU)

( * ) Notice: Subject to any disclaimer, the term of this patent is extended or adjusted under 35 U.S.C. 154(b) by 0 days.

(21) Appl. No.: 17/491,403

(22) Filed: Sep. 30, 2021

(65) Prior Publication Data
US 2022/0164124 A1 May 26, 2022

Related U.S. Application Data

(60) Provisional application No. 63/116,855, filed on Nov. 21, 2020.

(51) Int. Cl.
*G06F 3/06* (2006.01)
*G06F 21/64* (2013.01)
(Continued)

(52) U.S. Cl.
CPC .......... *G06F 3/0647* (2013.01); *G06F 3/0604* (2013.01); *G06F 3/067* (2013.01);
(Continued)

(58) Field of Classification Search
CPC .... G06F 3/0647; G06F 3/0604; G06F 3/0619; G06F 3/0659; G06F 3/067; G06F 3/0641;
(Continued)

(56) References Cited

U.S. PATENT DOCUMENTS

| 8,285,681 B2 | 10/2012 | Prahlad et al. |
| 8,407,190 B2 | 3/2013 | Prahlad et al. |

(Continued)

FOREIGN PATENT DOCUMENTS

| AU | 2010266433 A1 | 1/2012 |
| CA | 2765624 A1 | 1/2011 |

(Continued)

OTHER PUBLICATIONS

Yan, Z. et al. "Z-Dedup:A Case for Deduplicating Compressed Contents in Cloud," 2019 IEEE International Parallel and Distributed Processing Symposium (IPDPS), 2019, pp. 386-395, doi: 10.1109/IPDPS.2019.00049.

(Continued)

*Primary Examiner* — Masud K Khan

(57) ABSTRACT

Embodiments include systems and methods for mass data optimization. Embodiments include receiving user data from a user server which is being continuously collected locally by the user server and storing the user data on a storage device of a storage module, deduplicating the user data on the storage device, performed by the storage module, compressing the user data on the storage device, performed by the storage module, transparently intercepting the user data by a data intercept module, rerouting the transparently intercepted data to a data communication optimization module for optimization and intelligent routing, optimizing communication by the data communication optimization module so that the intercepted user data is configured differently for data communication to a remote centralized datacenter or server, and transmitting the differently configured data to a centralized datacenter or server.

15 Claims, 4 Drawing Sheets

(51) Int. Cl.
  *H04L 67/1008* (2022.01)
  *H04L 67/60* (2022.01)
  *H04L 67/567* (2022.01)
  *H04W 28/14* (2009.01)
(52) U.S. Cl.
  CPC .......... *G06F 3/0619* (2013.01); *G06F 3/0659* (2013.01); *G06F 21/64* (2013.01); *H04L 67/1008* (2013.01); *H04L 67/567* (2022.05); *H04L 67/60* (2022.05); *H04W 28/14* (2013.01)
(58) Field of Classification Search
  CPC ...... G06F 16/174; G06F 16/178; G06F 21/64; H04L 67/1097; H04L 67/1008; H04L 67/60; H04L 67/567; H04W 28/14
  See application file for complete search history.

(56) References Cited

U.S. PATENT DOCUMENTS

| | | | |
|---|---|---|---|
| 8,612,439 B2 | 12/2013 | Prahlad et al. | |
| 8,849,761 B2 | 9/2014 | Prahlad | |
| 8,849,955 B2 | 9/2014 | Prahlad et al. | |
| 9,171,008 B2 | 10/2015 | Prahlad et al. | |
| 9,454,537 B2 | 9/2016 | Prahlad et al. | |
| 10,027,547 B1* | 7/2018 | Weller | G06F 11/1466 |
| 10,248,657 B2 | 4/2019 | Prahlad et al. | |
| 2010/0332401 A1 | 12/2010 | Prahlad et al. | |
| 2010/0332454 A1 | 12/2010 | Prahlad et al. | |
| 2010/0332456 A1 | 12/2010 | Prahlad et al. | |
| 2010/0332479 A1 | 12/2010 | Prahlad et al. | |
| 2010/0332818 A1 | 12/2010 | Prahlad et al. | |
| 2010/0333116 A1 | 12/2010 | Prahlad et al. | |
| 2011/0106328 A1* | 5/2011 | Zhou | G05B 13/024 700/291 |
| 2013/0024424 A1 | 1/2013 | Prahlad et al. | |
| 2013/0238572 A1 | 9/2013 | Prahlad et al. | |
| 2015/0012495 A1 | 1/2015 | Prahlad et al. | |
| 2015/0066873 A1 | 3/2015 | Voruganti et al. | |
| 2017/0039218 A1 | 2/2017 | Prahlad et al. | |
| 2017/0272317 A1* | 9/2017 | Singla | H04L 67/02 |
| 2018/0034312 A1* | 2/2018 | Abdulla | H02J 7/35 |
| 2019/0042103 A1* | 2/2019 | Stabrawa | G06F 21/78 |
| 2019/0179805 A1 | 6/2019 | Prahlad et al. | |

FOREIGN PATENT DOCUMENTS

| | | |
|---|---|---|
| CA | 2838107 A1 | 1/2011 |
| EP | 2449477 A2 | 5/2012 |
| WO | 2011002777 A2 | 1/2011 |
| WO | 2015031773 A1 | 3/2015 |

OTHER PUBLICATIONS

Gao, Y. et al. Secure data deduplication for Internet-of-things sensor networks based on threshold dynamic adjustment. International Journal of Distributed Sensor Networks. Mar. 2020. doi:10.1177/1550147720911003.

Prajapati, P. et al A Reviewon Secure Data Deduplication: Cloud Storage Security Issue Journal of King Saud University—Computer and Information Sciences, Published Nov. 4, 2020.

Written Opinion of the International Searching Authority, PCT/AU2021/051367, dated Feb. 17, 2022.

International Search Report, PCT/AU2021/051367, dated Feb. 17, 2022.

\* cited by examiner

DEVICES AND METHODS FOR TRANSFERRING OPTIMIZED MASS DATA TO THE CLOUD

PRIORITY CROSS-REFERENCE TO RELATED APPLICATIONS

This application claims priority pursuant to 35 U.S.C. 119(e) from U.S. Provisional Patent Application No. 63/116,855 filed on Nov. 21, 2020.

TECHNICAL FIELD

The present disclosure relates generally to data synchronization, uploading, and downloading.

BACKGROUND

Massive data migration and synchronization can be quite difficult given data connection speeds, at remote data sites among many industries. Mining, for example, can require a lot of data gathering via Internet of Things (IoT) sensors locally, transmitted over a Fibre Channel (FC), or other form of data connection such as Geospatial, microwave, etc. existing at the remote site. Similarly, desktop users at remote sites, (and/or sites with worse data connections) may have slow connections, for example, when several users are streaming video simultaneously.

Telecommunication Companies, regional governments, hotels, Health Care sites are other examples of industries using massive amounts of data who want it all to be synchronized onto the cloud as well as among different site locations and regions. Similarly, these groups seek faster data communications for their sites as a whole. Data growth in the coming years can be nearly 100+Zettabytes of data communicated per day, while data channels provide a fraction of that capability, with channel speeds growing at a much slower pace. Therefore, a need exists for faster data transport, uplink, downlink and transfer at remote and/or limited connections sites as well as less (expensive) data usage at the sites.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a system of one or more computers which can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a device for data synchronization. The device also includes a switch, a storage module, a data intercept module, and a data communication optimization module. The device also includes a primary connectivity system and one or more processors, where the one or more processors are configured to execute a method. The method includes receiving user data from a user server which is being continuously collected locally by the server. The method also includes storing the user data on a storage device of the storage module. The method also includes deduplicating the user data on the storage device, performed by the storage module. The method also includes compressing the user data on the storage device, performed by the storage module. The method also includes transparently intercepting the user data by the data intercept module. The method may also include rerouting the transparently intercepted data to the data communication optimization module for optimization and intelligent routing. The method may include optimizing communication by the data communication optimization module so that the intercepted user data is configured differently for data communication to a remote centralized datacenter or server. The method may also include transmitting the differently configured data to the centralized datacenter or server. Other embodiments of this aspect include corresponding computer systems, apparatus, and computer programs recorded on one or more computer storage devices, each configured to perform the actions of the methods.

Implementations may include one or more of the following features. The device may include: a secondary connectivity system that gets used during times when the primary connectivity system does not have an internet or data connection. The primary connectivity system may be via a fibre channel connection, and the secondary connectivity system via a telecommunications network connection such as 4g, 5g, etc. The Data Storage Synchronization and Optimization Configuration Modules (DSSOCM) 110 may initiate a remedial procedure when the sensor notifies of a moist, hot or cold condition. The device may include: an internet of things sensor which senses when the device has been opened, and transmits a notification via the DSSOCM 110 to the network when the device was opened. The device may include: an uninterruptable power supply that allows for continuous power of the device when the device's power goes out. Implementations of the described techniques may include hardware, a method or process, or computer software on a computer-accessible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
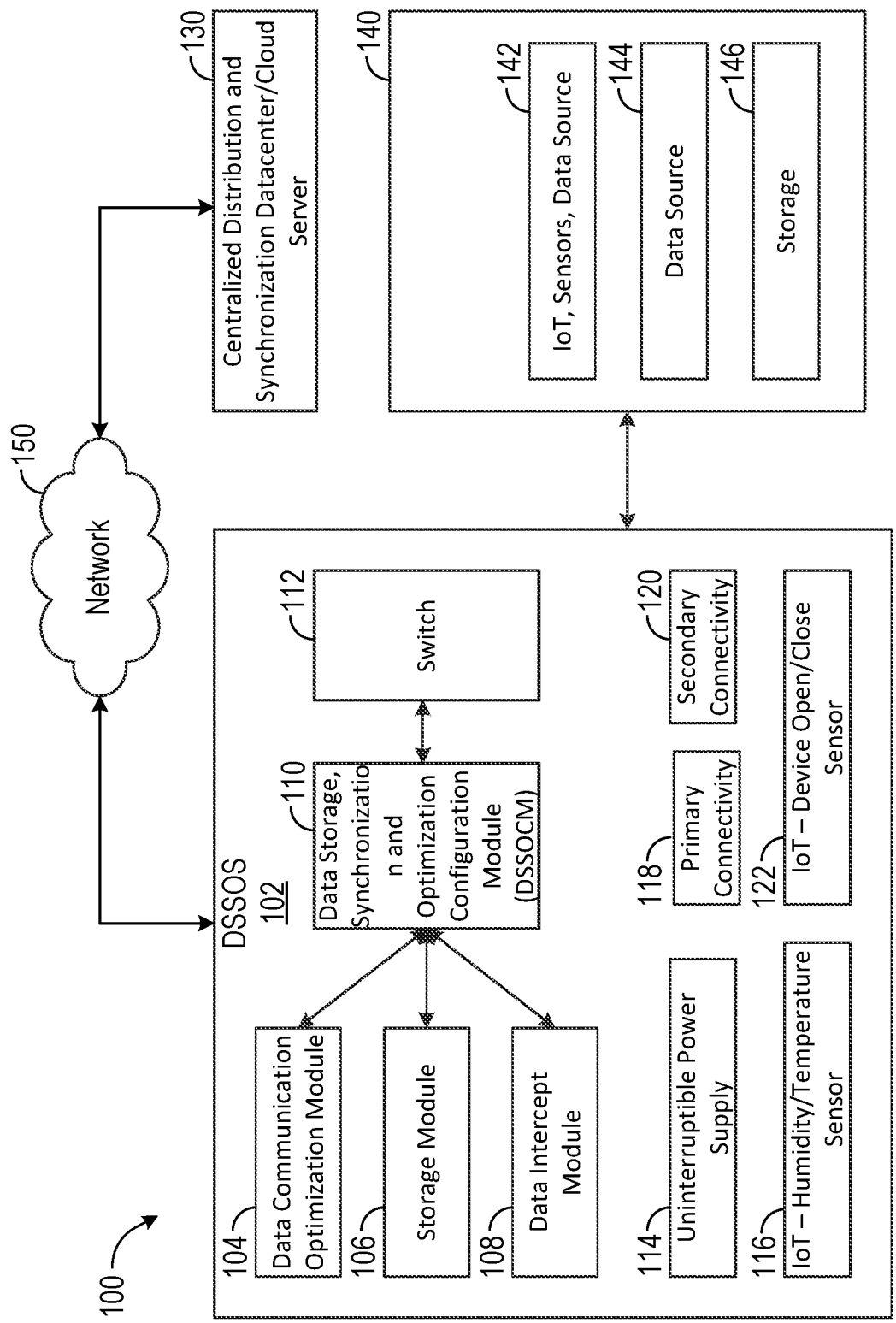
FIG. 1 illustrates an exemplary system diagram.

It is important to note that the embodiments disclosed herein are only examples of the many advantageous uses of the innovative teachings presented. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include systems and methods for cloud Edge Computing, end user computing, and remote end user solutions providing vastly improved remote site performance capability. The effect of improvements described enable enterprise grade computing services such as those provided by Amazon™, Microsoft™, and Google™ without service degradation. Embodiments create optimization for network traffic, storage, data replication, data migration, as well as for data communication use of end users.

Some embodiments include a system that stores data provided by a user device or server. The data then goes through a deduplication procedure followed by compression. The data then gets transparently intercepted by a data migration module. The data then gets sent to an optimization module where it gets optimized and processed for intelligent traffic routing. The data finally gets output to a remote cloud device, server, or datacenter for storage, and synchronization to other sites. In some embodiments, the user device connects via a network to a datacenter where the deduplication, transparent intercept and optimization occurs on a device in the datacenter remote from the user location.

In some embodiments, a user device connects to a datacenter via a 1 gigabyte, 10 gigabyte, or 100 gigabyte data connection, for example which is in turn connected to storage on the cloud. For example, a datacenter at a remote site like a mining excavation or remote hospital may connect via one or more mega ports to a centralized datacenter where the novel devices are stored. Depending on the user requirements, one or more server devices are configured on the centralized datacenter.

The system may provide heterogenous connectivity for a variety of systems to interconnect (any source to any destination). The processing is application transparent, enabling a non-intrusive, zero downtime implementation. The system and exemplary embodiments provide much faster advanced data synchronization, deduplication, and optimization. The storage module may provide seamless replication from separate data sources, plus advanced security and optimization features. The storage module may further provide a consistent data management platform across all environments. The storage module may include security and protection policies capabilities including ransomware protection, etc.

The data communication optimization module may provide intelligent use of connectivity options. The data communication optimization module may also provide data reduction across the network for uploading and downloading.

FIG. 1 shows an example system diagram 100 utilized to describe the various disclosed embodiments. The Network 150 may be, but is not limited to, a wireless, cellular or wired network, local area network (LAN), a Wide Area Network (WAN), Software-Defined Networking WAN (SDWAN), a metro area network (MAN), the Internet, the World Wide Web (WWW), a satellite communication network, a geo-spatial link, microwave link, or similar networks, and/or any combination therein.

In some embodiments all or part of the system may be implemented as one or more serverless or virtual functions. For example, Amazon Web Services™, Google App Engine™, Microsoft Azure™ systems or functions may be used for all or part of the services and embodiments described herein. Further, one or more virtual machines running on shared hardware may be used to implement all or part of the methods described. Network Functions Virtualization (NFV) on Software Defined Networks (SDN) and their methods may also be used for all of part of the systems and embodiments described.

The Data Storage, Synchronization and Optimization Server (DSSOS) 102 may be included as all software or hardware or a mix thereof. In some embodiments all or part of the DSSOS 102 may be done on a quantum computer or using quantum computing capabilities. The DSSOS 102 may contain several elements used for storage, data deduplication, compression, synchronization and communication optimization. The DSSOS may include one or more Data Communication Optimization Modules 104, Storage Modules 106, Data Intercept Modules 108, Switch 112, DSSOCM 110. Additionally, the DSSOS 102 may contain one or more Uninterruptable Power Supplies (UPS) 114, IoT humidity or temperature sensors 116, IoT Device Opening Sensor 122, and Connectivity.

In some embodiments, the DSSOS 102 may be stored on or in the Centralized Distribution and Synchronization Datacenter or Cloud Server 130. For example, the DSSOS 102 may be a server on a rack in a datacenter of Centralized Distribution and Synchronization Datacenter or Cloud Server 130. When the DSSOS 102 is in Centralized Distribution and Synchronization Datacenter or Cloud Server 130 the User Server 140 may be connected via a high bandwidth mega port to the DSSOS 102. In that case the data deduplication, transparent intercept and optimization may take place on the DSSOS 102 in the Centralized Distribution and Synchronization Datacenter or Cloud Server 130. This may provide an even more efficient processing solution for the greater power capabilities available in the Centralized Distribution and Synchronization Datacenter or Cloud Server 130.

The Data Communication Optimization Module 104 may be included as all software or hardware or a mix thereof. The Data Communication Optimization Module 104 may allow intelligent use of connectivity options such as switching between the primary connectivity 118 and secondary connectivity 120, up to any number of connectivity options in some embodiments. The Data Communication Optimization Module 104 may create data reduction across the network. The Data Communication Optimization Module 104 may further provide a Firewall security and SDN capabilities for various networks such as a WAN or SDWAN, MAN, the internet, a Municipal Wireless Network, etc.

Primary connectivity 118 and secondary connectivity 120 are exemplary as is known in the art and exemplify bandwidth aggregation alternatives. Further, in other embodiments more than one connection may be combined to provide a single connection implementation using bandwidth aggregation. The single connection implementation may be simple and/or complex considering any number, arrangement, or types of connections. Further, the bandwidth aggregation may include load balancing, failover, and/or connection teaming, for example. Channel bundling using Multilink Point-to-Point Protocol (MPPP) for example.

The Data Communication Optimization Module 104 may use many techniques for data optimization. Some examples include scalable data referencing, bidirectional synchronized data stores, and/or unified data stores between devices. Another example of optimization methods include transport streamlining, such as using delay-based algorithms (bandwidth estimation techniques), Quality of Service parameter settings (e.g. minimum and maximum available bandwidth percentages set for TCP connections, and buffer size configuration for TCP algorithms. Additional forms of optimization include bandwidth estimation, high speed TCP, Space Communications Protocol Standards methods such as a slow-start algorithm or a modified congestion avoidance approach ramping up flows faster for high-latency environments. Connection pooling, Application-based Streamlining, and Management Streamlining are other examples of methods that can be used for optimization. Further, the Data Communication Optimization Module 104 may use a quantum computer system, quantum computing based CPU or quantum computing capabilities to perform the data optimization.

The Storage Modules 106 may be included as all software or hardware or a mix thereof. For example, the Storage Module 106 may include physical storage such as Fabric Attached Storage (FAS), (All-Flash FAS (AFF), All Storage Area Network (SAN) Array, hard disks, storage controller (s). The Storage Module 106 may include capabilities for a Fibre Channel, iSCSI protocol, Fibre Channel over Ethernet (FCoE), and Fibre Channel Non-Volatile Memory express (FC-NVMe) protocol. The Storage Module 106 may be able to perform data deduplication and compression according to any of various protocols or processes well known in the art as well as those discussed below.

The Storage Module 106 may enable seamless replication from third party data sources with advanced security and optimization features. The Storage Module 106 may provide a consistent data management platform across all system environments. Additionally, the Storage Module 106 may provide a common set of security and protection policies with advanced capabilities such as Ransomware protection.

The Data Intercept Module 108 may be included as all software or hardware or a mix thereof. The Data Intercept Module 108 may be configured to intercept all incoming data via the switch and provide it to the Storage Module 106 for synchronization or upload and download. The Data Intercept Module 108 may enable heterogenous connectivity, where any source system can connect to any destination system. Further, the transparent application intercept enables zero down time implementation of continuous storage synchronization and backup.

The Switch(es) 112 may be included as all software or hardware or a mix thereof. The Switch 112 may be a combination of a 10 GB Small Form-factor Pluggable+ (SFP+) and 1 GB ethernet or a Fiber Channel, for example. The Switch 112 may provide connectivity between the User Server 140 and the DSSOS 102. The switch 112 may have one or more hardware ports when implemented in hardware that connect the User Server 140 to the Storage Module 106, Data Intercept Module 108, Data Communication Optimization Module 104, and the DSSOCM 110.

The DSSOCM 110 may be included as all software or hardware or a mix thereof. For example, the DSSOCM 110 may be stored on a Field Programmable Gate Array (FPGA) device, or an embedded circuit on the same Printed Circuit Board (PCB) as the other modules. The DSSOCM 110 may control coordination between the various modules, sensors and switch and allow configuration and communication via a Graphical User Interface or remotely via a connection used over the internet.

A UPS 114 may be supplied in order to provide continuous uninterrupted power. The IoT humidity or temperature sensors 116 may be used to sense when the DSSOS 102 is in an area that is overheating or that is providing insufficient ventilation. In either case remedial steps may be taken such as shutting down, shutting down certain storage elements, or going into a safe mode with limited usage of the device. IoT Device Opening Sensor 122 may also be used to sense when a user has opened the device and to transmit an indication so that a warranty of the DSSOS 102 can be monitored and tracked via the DSSOCM 110.

The Primary Connectivity 118 may include Ethernet cables to connect to the network or coaxial cable to provide a wired physical connection. Also, a wireless system, for example, Satellite connection, Microwave link, cellular, etc. may be used. Any kind of connectivity, number, or combination thereof may be used or included. The Secondary Connectivity 120 may include a backup connectivity option including wireless systems or on-board chips such as 4G, 5G, etc. The Secondary Connectivity 120 may be included with a Subscriber Identity Module (SIM) card or multiple SIM cards attached to network provisioned service in case of downtime for the Primary Connectivity 118. The Secondary Connectivity 120 connection and system enables continuous and more reliable synchronization of data between the DSSOS 102 and the Centralized Distribution and Synchronization Datacenter or Cloud Server 130. The Primary and Secondary Connectivity 118-120 are merely exemplary, and any number of connections, or combinations, as mentioned may be used.

The Primary and Secondary Connectivity 118-120 systems are exemplary and additional connectivity options may be available. For example, Satellite, Microwave link, 4G, 5G, Bluetooth, beam forming, antenna arrays, radio or any combination of one or more of each may be used as the several connectivity options among any configuration. Additionally bandwidth aggregation, as mentioned above, may be used in any variety of forms rather than 2 or more distinct connectivity systems like Primary and Secondary Connectivity 118-120.

The DSSOCM 110 may detect any gap in network traffic or transmission to the Centralized Datacenter 130 and automatically switch the DSSOS 102 to the Secondary Connectivity 120. In a similar fashion, the DSSOCM 110 may detect a return to service for the Primary Connectivity 118 and switch back the synchronization to the Primary Connectivity 118. In this way the DSSOCM 110 may enable continuous service and provide significantly faster synchronization rates for data. Additionally, the DSSOCM 110 may manage bandwidth aggregation in an alternative embodiment.

Centralized Distribution and Synchronization Datacenter/ Cloud Server 130 may include a centralized datacenter for the User and/or a centralized enterprise cloud service being used by the User Server/Device 140.

The User Server/Device 140 may be a server storing and aggregating local information from the User or uploading and downloading data for the User. The User Server/Device 140 may include IoT, Sensors, and Data Source 142, Data Source 144 and/or Storage 146. The IoT, Sensors, Data Source 142 may include data from local sensors of any kind of the User Server/Device 140. The Data Source 144 may be an active data source not gathered from the IoT or sensors directly.

For example, a User may be a hospital which aggregates all patient Electronic Medical Records and data to a central repository or server in the hospital. The central repository may be connected to a DSSOS 102 whereby data is continuously processed, stored, and transmitted to a remote centralized datacenter. For example, the hospital may be in a remote location with a satellite or microwave link communication connection. In another example, a geological excavation, archaeological dig, or mining site may be using several sensors to collect massive amounts of data locally on a server such as User Server/Device 140. The geological excavation, archaeological dig, or mining site may store continuously data on their local User Device/Server which may be connected to a DSSOS 102. The DSSOS 102 may provide capabilities such as synchronization with a remote datacenter at a much faster rate, with no downtown as described with respect to the embodiments described herein as well as upload and download for other data use and/or streaming for users.

The DSSOS 102 at the geological excavation, archaeological dig, or mining site may store the data in the Storage Module, and perform deduplication and compression. The DSSOS 102 may transparently intercept via the Data Intercept Module 108 all data being stored on the User Device 140 as well as on the Storage Module 106 and transmit via the Data Communication Optimization Module 104 over one or more communication channels in an optimized and continuous manner.

Figure 2:
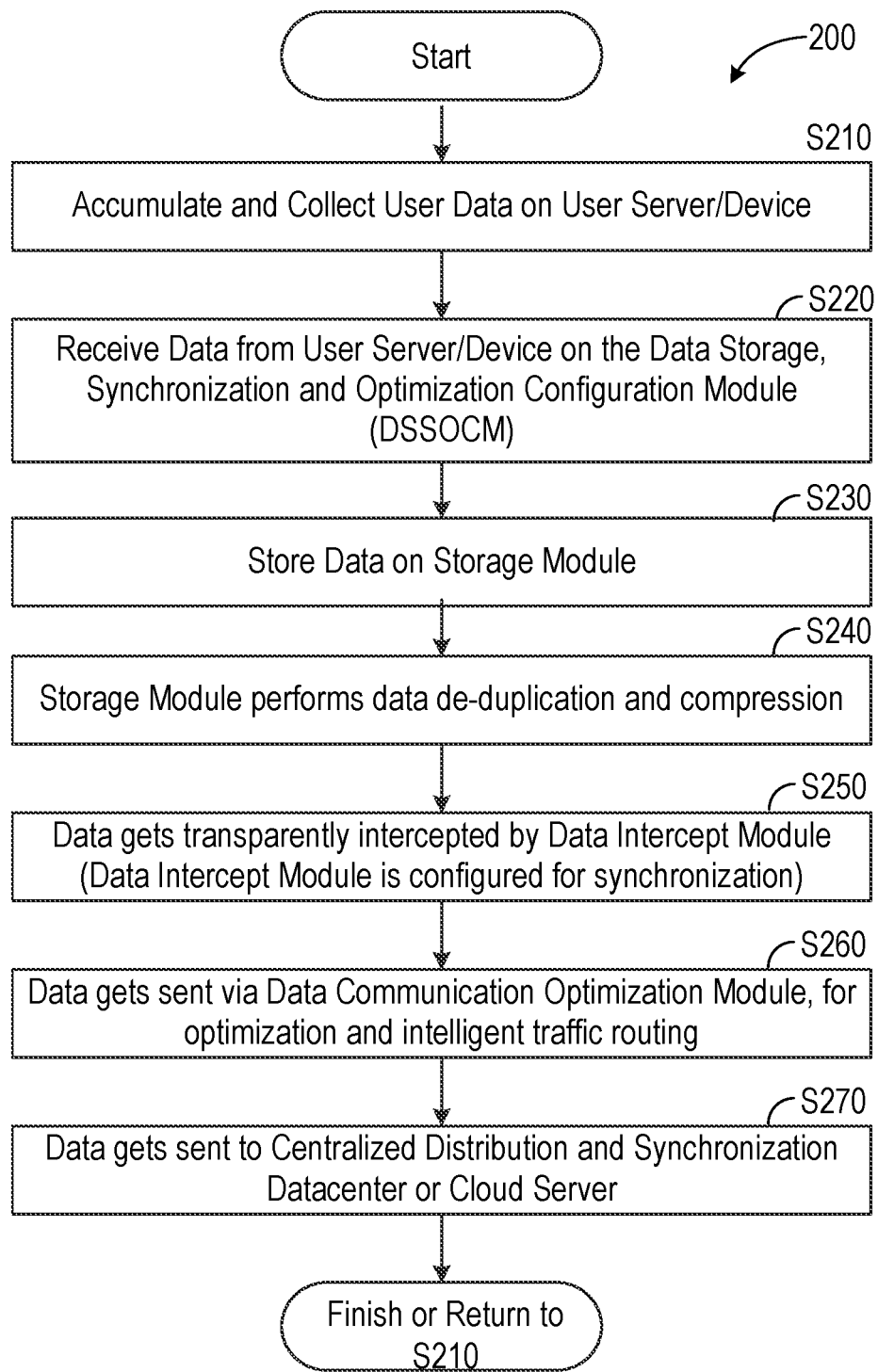
FIG. 2 illustrates a method of Transferring Optimized Mass Data to The Cloud, according to some embodiments.

FIG. 2 illustrates a method 200 of Transferring Optimized Mass Data to The Cloud, according to some embodiments. The system may begin in step S210 where the User Device/Server 140 accumulates, aggregates, stores and collects user data on the User Server/Device. In some embodiments, this may include all data at a site which is remote like a government entity such as an army base isolated in a foreign land. Numerous examples can be considered including healthcare sites, industrial compounds, factories, farms, mining, etc. The data that is accumulated may be in communication with the DSSOS at all times via the Switch for continuous backup to the Centralized Distribution and Synchronization Datacenter.

The system may proceed to step S220 where the DSSOS receives the data. The User Server/Device may be connected via a Fibre Channel, Internet Small Computer Systems Interface (iSCSI) interface, wireless connection, mega port, etc. The data may arrive at the Switch, be presented to the DSSOCM 110 for management and communication via the various modules. The data may be accessed as Direct-attached Storage (DAS), Network-attached Storage (NAS), or on a Storage Area Network (SAN), for example.

In step S230 the Data Storage Module may store copies of the data as replicated at the User Server/Device. Data may be stored on Solid-State Drives (SSD), tape drives, optical drives, Redundant Array of Independent Disks (RAID), NVMe, Quad-level Cell Not-And (QLC NAND), QLC Flash, etc. The Storage Module may be made up of any or a combination of the storage types mentioned as well as others known in the art.

In step S240 the Storage Module may perform de-duplication of the data as well as compression. De-duplication may force removal of duplicated blocks and replacement with references to blocks which are shared. The data received may be batch processed to create a table, catalog, dictionary, or other data structure of block identifications such as a hash or a signature. To manage the de-duplication, the Storage Module may compare signatures of hashes to verify blocks have not changed. When all bytes are matched, a duplicate block may be discarded and drive space reclaimed.

The data may be compressed in any manner of data compression known. An example of a compression technique includes combining blocks into groups and storing the groups as individual blocks. During reads, the compression groups may be read alone rather than the entire file. Data compression may be performed during receipt from the User Server/Device as well as after writing the data (postprocessing). Compression may include compaction of the data including storing zero padded or small files in a fixed block size such as 1 kilobyte, 10 kilobytes, 100 kilobytes, etc.

In step S250, the Data Intercept Module may intercept the data that is getting managed by the Storage Module. The Data Intercept Module may intercept via any number of methods known in the art. For example, the Data Intercept Module may intercept identifiers such as World Wide Port Name (WWPN) from a User Server attached to a first port on the Switch. The Data Intercept Module may then spoof the first port, receive a WWPN from a second port, spoof the second port and in that way receive the data for synchronization in further steps of the process. Other examples of data intercept may be seen in U.S. application Ser. No. 13/725,326, incorporated herein by reference in its entirety.

In step S260 the Data Intercept Module may provide the data to the Data Communication Optimization Module where transmission optimization and smart traffic routing will occur. Optimization may include any of several methods for optimizing data including those described above. For example, Transport Control (TCP) packets or data streams may be broken into unique data chunks or groups and assigned an identity. When identical byte sequences take place in future synchronizations of data, the identity is sent rather than the data, saving significant transmission time and resources. The receiving entity may reconstruct using the identifier. Transmission encoded data can also be sped up by decoding various formats on the Data Intercept Module before transmission.

In step S270, the data may get sent to the Centralized Distribution and Synchronization Datacenter or Cloud Server 130 over network 150. In some embodiments, the DSSOS 102 may be in a rack in the Centralized Distribution and Synchronization Datacenter or Cloud Server 130 and the data may get transferred from DSSOS 102 to another server in 130 locally.

Figure 3:
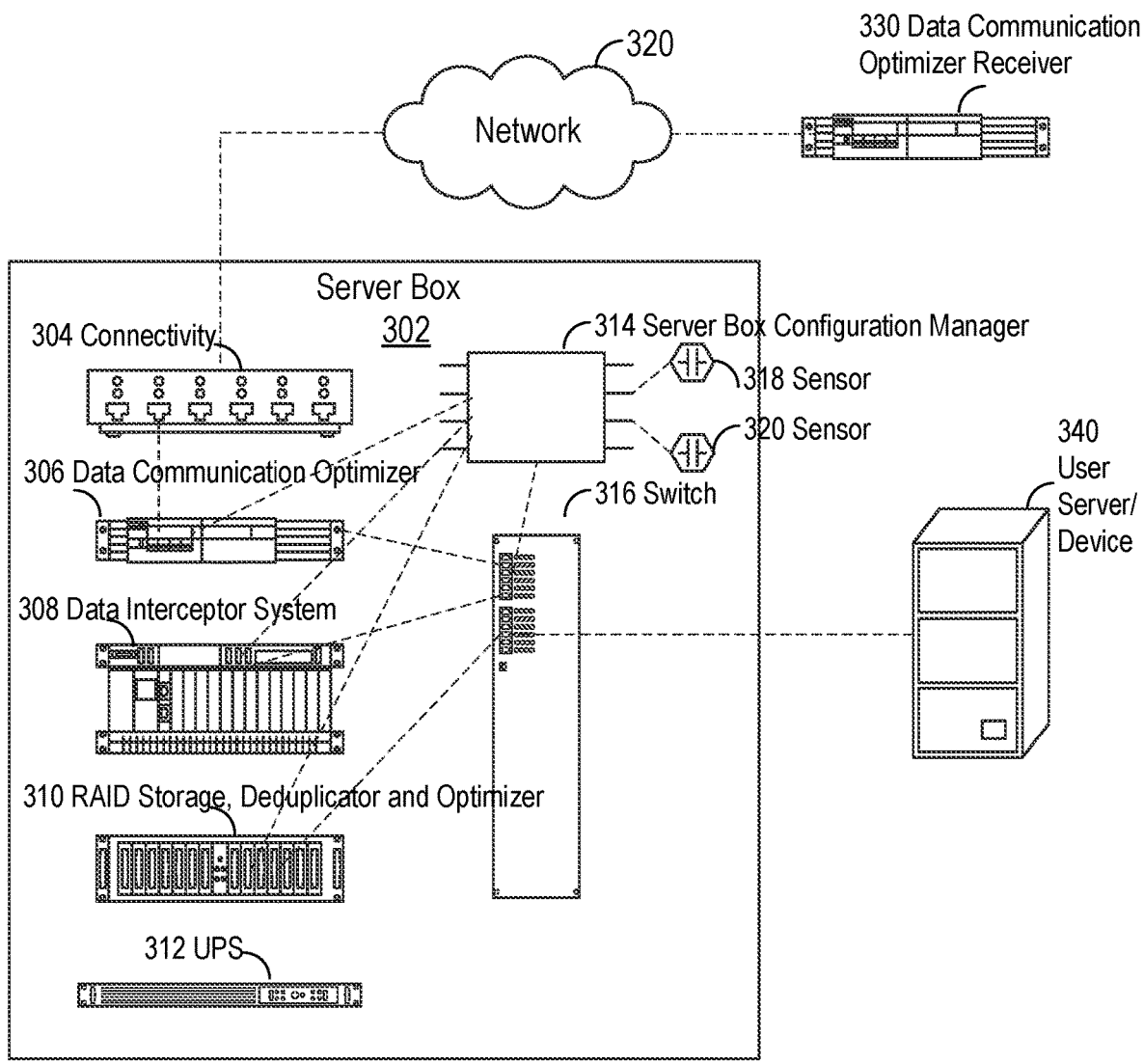
FIG. 3 is a sample implementation of a Data Storage, Synchronization and Optimization Server.

FIG. 3 is a sample implementation of a Data Storage, Synchronization and Optimization Server 102. As illustrated, all components are presented in hardware format in the same physical box. The Server Box 302 may include a Connectivity system 304 that enables various formats of communication between the Server Box 302 and the network 320. The Data Communications Optimizer 306 is presented as a component device within the system including a processor, memory and programming for optimizing data transmission over a network such as a SDWAN. The Data Communication Optimizer 306, Data Interceptor System 308 and RAID Storage, Deduplication and Optimizer 310 may all be connected to Switch 316, which is in turn connected to the User Server/Device 340 for receiving and processing the Data from the User including uploading/downloading.

The Data Interceptor System 308 as illustrated may be a component within the system including its own processor, memory and input/output ports that intercepts the data arriving from the User Server/Device 340, transmits a spoof to the requesting port and routes the incoming data to the Data Communication Optimizer 306 for synchronization to a Centralized Datacenter or Enterprise Cloud such as Data Communication Optimizer Receiver 330. The RAID Storage, Deduplicator, and Optimizer 310 may act as Storage Module 106 where copies of the data can be stored, blocks modified for deduplication, and the data compressed using the methods described herein.

The Server Box Configuration Manager 314 may act as a central manager for the processing and synchronization, storage, optimization and transport of data coming from the User Server/Device. The Server Box Configuration Manager 314 may implement DSSOCM 110, for example. The Server Box Configuration Manager 314 may be a microcontroller, System on a Chip (SoC) or an embedded system including logic to control the other parts to produce the communication flow depicted in FIG. 2 and described above. For example, the Server Box Configuration Manager 314 may ensure that the RAID Storage, Deduplicator, and Optimizer 310 has finished deduplication and compression of the data before being intercepted by the Data Interceptor System 308. Further, the Server Box Configuration Manager 314 may monitor the Data Interceptor System 308 to ensure it is configured for synchronization and performing as described above. The Server Box Configuration Manager 314 may make sure that the user data is getting intercepted and then processed by the Data Communication Optimizer 306 for network traffic. Finally, the Server Box Configuration Manager 314 may use and detect Sensors 318-320 for either poor physical conditions for the Server Box 302 or tampering with the box itself. Server Box 302 may further have one or more Uninterruptible Power Supplies 312 attached or separate from the box.

Figure 4:
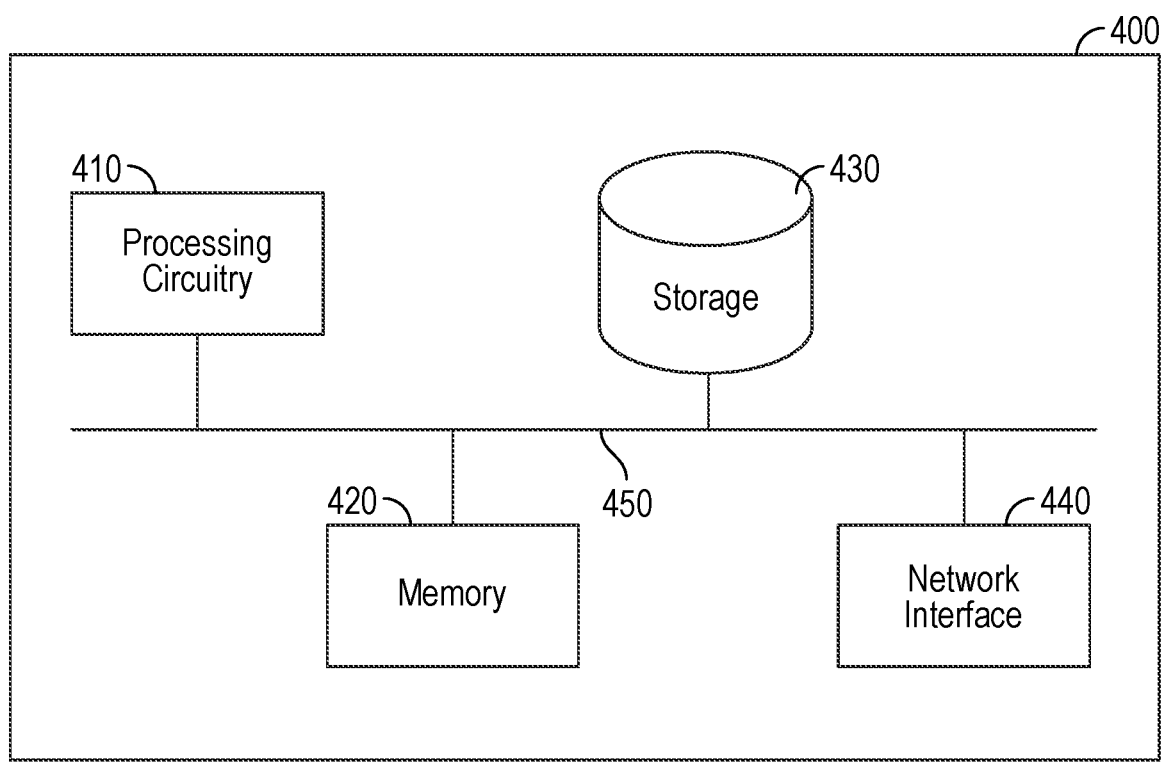
FIG. 4 is an example schematic diagram of a system, module, or device.

FIG. 4 is an example schematic diagram 400 of a system, module, or device according to various embodiments. The system, module, or device, may include a processing circuitry 410 coupled to a memory 420, a storage 430, and a network interface 440. In an embodiment, the components of the system, module, or may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 420 may be volatile (e.g., RAM, etc.), non-volatile (e.g., ROM, flash memory, etc.), or a combination thereof. In one configuration, computer readable instructions to implement one or more embodiments disclosed herein may be stored in the storage 430.

In another embodiment, the memory 420 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein. Specifically, the instructions, when executed, cause the processing circuitry 410 to perform data storage, optimization, synchronization, upload and download between a local User Server and a remote centralized datacenter or server.

The storage 430 may be magnetic storage, optical storage, and the like, and may be realized, for example, as flash memory, RAID, NVMe, or other memory technology, Digital Versatile Disks (DVDs), or any other medium which can be used to store the desired information.

The network interface 440 allows the system, module, or device to communicate with the Centralized Distribution and Synchronization Datacenter/Cloud Server for the purpose of, for example, synchronizing, uploading/downloading, and copying data. Further, the network interface 440 allows the system, module, or device to communicate with the User Server for the purpose of collecting and storing data.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture including use of quantum computers/quantum computing capabilities. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C;

3A; A and B in combination; B and C in combination; A and C in combination; A, B, and C in combination; 2A and C in combination; A, 3B, and 2C in combination; and the like.

What is claimed is:

1. A device for data synchronization, comprising:
a switch;
a storage module;
a data intercept module;
a data communication optimization module;
a Data Storage Synchronization and Optimization Configuration Module (DSSOCM);
a humidity sensor:
a primary connectivity system; and
one or more processors, wherein the one or more processors are configured to execute a method comprising:
  receiving user data from a user server which is being continuously collected locally by the user server;
  storing the user data on a storage device of the storage module;
  deduplicating the user data on the storage device, performed by the storage module;
  compressing the user data on the storage device, performed by the storage module;
  transparently intercepting the user data by the data intercept module;
  rerouting the transparently intercepted user data to the data communication optimization module for optimization and intelligent routing;
  optimizing communication by the data communication optimization module so that the transparently intercepted user data is configured differently for data communication to a remote centralized datacenter or a cloud server;
  transmitting the differently configured user data to the centralized datacenter or the cloud server;
  receiving a notification from the humidity sensor when an area around the device is too moist, hot or cold; and
  limiting, by the DSSOCM, at least one function of the device based on the notification received from the humidity sensor, wherein the limiting the at least one function of the device includes going into a safe mode with limited usage of the device.

2. The device of claim 1, further comprising:
a secondary connectivity system that gets used during times when the primary connectivity system does not have an internet or data connection.

3. The device of claim 1, further comprising:
a secondary connectivity system that gets used during times when the primary connectivity system does not have an internet or data connection, wherein the primary connectivity system is via a Fibre Channel connection, and the secondary connectivity system is via a telecommunications network connection such as 4G, 5G, etc.

4. The device of claim 1, further comprising:
an Internet of Things sensor configured to sense when the device has been opened,
wherein the DSSOCM transmits a notification to a network based on the opening of the device sensed by the Internet of Things sensor.

5. The device of claim 1, further comprising:
an Uninterruptable Power Supply that allows for continuous power of the device when the device's power goes out.

6. A method comprising:
in a device,
  receiving user data from a user server which is being continuously collected locally by the user server;
  storing the user data on a storage device of a storage module;
  deduplicating the user data on the storage device, performed by the storage module;
  compressing the user data on the storage device, performed by the storage module;
  transparently intercepting the user data by a data intercept module;
  rerouting the transparently intercepted user data to a data communication optimization module for optimization and intelligent routing;
  optimizing communication by the data communication optimization module so that the transparently intercepted user data is configured differently for data communication to a remote centralized datacenter or a cloud server;
  transmitting the differently configured data to a centralized datacenter or server;
  receiving a notification from a humidity sensor when an area around the device is too moist, hot or cold; and
  limiting, by a DSSOCM, at least one function of the device based on the notification received from the humidity sensor, wherein the limiting the at least one function of the device includes going into a safe mode with limited usage of the device.

7. The method of claim 6, further comprising:
using a secondary connectivity system during times when a primary connectivity system associated with the device does not have an internet or data connection.

8. The method of claim 6, further comprising:
using a secondary connectivity system during times when a primary connectivity system associated with the device does not have an internet or data connection, wherein the primary connectivity system is via a Fibre Channel connection, and the secondary connectivity system is via a telecommunications network connection such as 4G, 5G, etc.

9. The method of claim 6, further comprising:
sensing, by an Internet of Things sensor, when the device has been opened, and
transmitting, by the DSSOCM, a notification to a network when the device was opened.

10. The method of claim 6, further comprising:
allowing, by an Uninterruptable Power Supply, for continuous power of the device when the device's power goes out.

11. A device for data synchronization in a data center at a first location, comprising:
a switch;
a storage module;
a data intercept module;
a data communication optimization module;
a Data Storage Synchronization and Optimization Configuration Module (DSSOCM);
an Internet of Things sensor configured to sense when the device has been opened;
a primary connectivity system; and
one or more processors, wherein the one or more processors are configured to execute a method comprising:
  receiving, by the device at the data center, user data from a user server at a second location, the second location different from the first location, which is being continuously collected at the second location by the user server;

storing the user data on a storage device of the storage module;

deduplicating the user data on the storage device, performed by the storage module;

compressing the user data on the storage device, performed by the storage module;

transparently intercepting the user data by the data intercept module;

rerouting the transparently intercepted user data to the data communication optimization module for optimization and intelligent routing;

optimizing communication by the data communication optimization module so that the transparently intercepted user data is configured differently for data communication to a data center server at the first location;

transmitting the differently configured data to the data center server; and transmitting, by the DSSOCM, a notification to a network based on the opening of the device sensed by the Internet of Things sensor.

12. The device of claim 11, further comprising:
a secondary connectivity system that gets used during times when the primary connectivity system does not have an internet or data connection.

13. The device of claim 11, further comprising:
a secondary connectivity system that gets used during times when the primary connectivity system does not have an internet or data connection, wherein the primary connectivity system is via a Fibre Channel connection, and the secondary connectivity system is via a telecommunications network connection such as 4G, 5G, etc.

14. The device of claim 11, further comprising:
a humidity sensor which notifies the DSSOCM when an area around the device is too moist, hot or cold; and
wherein the DSSOCM limits at least one function of the device based on the notification received from the humidity sensor, wherein the limiting the at least one function of the device includes going into a safe mode with limited usage of the device.

15. The device of claim 11, further comprising:
an Uninterruptable Power Supply that allows for continuous power of the device when the device's power goes out.

* * * * *